United States Patent Office 3,689,323

Patented Sept. 5, 1972

3,689,323

SOLID IONIC CONDUCTORS

Geoffrey W. Mellors, Strongsville, Ohio, assignor to Union Carbide Corporation, New York, N.Y.

No Drawing. Filed July 16, 1970, Ser. No. 55,623
Int. Cl. H01m *11/00*; C01c *3/08*
U.S. Cl. 136—153 8 Claims

ABSTRACT OF THE DISCLOSURE

The addition of iodides or cyanides of metals manganese, iron, cobalt, nickel, copper, zinc, gallium, cadmium, indium, tin, gold, mercury and thallium to binary compositions of silver iodide and alkali metal cyanide or silver iodide and alkali metal iodide produces ionic conductors of good specific conductivity and lower cost.

This invention relates to solid ionic conductors.

Ionic conductivity is usually associated with the flow of ions through an aqueous solution of metallic salts. In the vast majority of practical uses of ionic conductors i.e. as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have specific conductances approaching those exhibited by the commonly used liquid systems. Most solids have specific conductances at room temperature (20° C.) in the range of $10^{-6}$ to $10^{-15}$ $ohm^{-1}$ $cm.^{-1}$ as compared to aqueous solutions of salts which nominally have a specific conductance of 0.5 to 0.8 $ohm^{-1}$ $cm.^{-1}$.

In application Ser. No. 8,709, now Pat. 3,582,291, filed Feb. 4, 1970, solid ionic conductors having relatively high specific conductance compared to previously known solid ionic conductors are disclosed. The materials have the following general formula:

$$MCN—4AgI$$

wherein M is potassium, rubidium, cesium or mixtures thereof; $x$AgI—$y$MCN—$z$AgCN wherein $x$ is 0.45 to 0.95 mole, $y$ is $(1-x$ mole) and the ratio of $y$ to z is infinity to to 1 or $z$ is $(1-x$ mole) and the ratio of $y$ to $z$ varies between 1 to 1 and 1 to 9. In U.S. Pat. 3,443,997 and in British Pat. 1,140,398 binary compounds of AgI and KI are disclosed as ionic conductors. While the materials disclosed have useful properties, they have a tendency to thermodynamic instability at temperatures below about 20° to 30° C. Moreover, they are relatively expensive in that the ratio of silver iodide to other constituent is about 4 to 1.

The principal object of this invention is the provision of solid ionic conductors not only having good conductivity and stability but containing lesser quantities of silver iodide than used in the prior art to extend the utility of solid electrolyte systems.

The invention by means of which this object is achieved comprises at least ternary compositions of metal iodides and metal cyanides, at least a portion of the composition being silver iodide, a second portion of the composition being iodide or cyanide of an alkali metal selected from the group consisting of potassium, rubidium and cesium, and a third component being an iodide or cyanide of a metal selected from the group consisting of manganese, iron, cobalt, nickel, copper, zinc, gallium, cadmium, indium, tin, gold, mercury and thallium.

Stated another way, the invention comprises modification of the binary solid ionic conductors of the application referred to, i.e. MCN—4AgI and of the patents referred to, i.e. 4AgI·KI, by the addition of metal iodide and/or metal cyanide. Since it is desirable to produce materials containing less of the expensive silver compounds, enough additive should be used to provide a substantial economic benefit, but, of course, not so much additive should be used that the conductivity of the resulting material is undesirably low. As a general rule of thumb the addition of about 1 mole of metal cyanide or iodide to either of the binary systems will produce a desirable cost decrease without serious detriment to conductivity. Generally, a specific conductance below about $5\times10^{-4}$ $ohm^{-1}$ $cm.^{-1}$ at 25° C. is considered poor, and it is preferred that the specific conductance of the compositions of the invention be well above this value and most desirably not lower than about $1\times10^{-3}$ $ohm^{-1}$ $cm.^{-1}$ at 25° C. Additions of more than 1 mole of metal iodide or cyanide to the binary systems can be used if specific conductivity does not fall below these desirable levels.

Since the additive metal iodide or metal cyanide can be considered as being in the nature of a diluent and since generally the additives are very poor ionic conductors, if not insulators, it is surprising that substantial quantities of them may be used to replace silver iodide in the compositions without serious lowering of specific conductance. It should not be surprising to those skilled in the art, however, that certain additives from the group listed may be less satisfactory than others and that the effect of one additive on one binary system may be quite different from its effect on the other binary system.

Since the mechanism of ionic conductivity in solids is not entirely understood the possible effect of an additive can not be prognosticated with complete accuracy. It is believed, however, that ionic conductivity is fostered by "open" structures which permit movement of the silver ion. Any additive which would tend to "close" the structure would tend to lessen conductivity while conversely any additive which would tend to "loosen" or open the structure of the binary material might be expected even to improve its conductivity. To determine the structure of the materials to which the invention relates, the X-ray is a useful tool. An X-ray diffraction pattern of the binary material has a characteristic appearance, showing a number of widely spaced peaks. The pattern is quite different from that of either of the constituents of the binary systems. If a composition containing an additive has the characteristic X-ray pattern of the binary composition, it can be expected that the ternary composition will have good conductivity. If the pattern is substantially different, it is likely that conductivity will be substantially lower in the ternary composition than in the binary composition.

The compositions of the invention are not difficult o prepare. The starting materials should be of reasonable purity and must be maintained free of water. The materials, in desired proportions, are melted in a suitable closed vessel under an inert gas (argon, helium, or nitrogen, for example) and when all are molten and thoroughly mixed, the molten mass should be quenched to room temperature. The resulting mass may be crushed and formed into pellets, care being taken to prevent moisture pickup. A large number of samples of different compositions have been prepared in this way and their resistance was measured with a standard 1000 cycle conductance bridge. The following table sets forth a representative group of compositions exemplary of the invention together with the specific conductance of each as determined experimentally at 25° C.

TABLE I

| Molar composition | Spec. conductance (ohm$^{-1}$ cm.$^{-1}$, 25° C.) |
|---|---|
| 4 AgI—KI—Zn $(CN)_2$ | $1.40 \times 10^{-1}$ |
| 4 AgI—KCN—Zn $(CN)_2$ | $6.67 \times 10^{-2}$ |
| 4 AgI—KI—2Zn $(CN)_2$ | $6.25 \times 10^{-2}$ |
| 2 AgI—KCN—Zn $(CN)_2$ | $1.11 \times 10^{-2}$ |
| 5 AgI—KI—Cd $(CN)_2$ | $5.0 \times 10^{-3}$ |
| 4 AgI—KI—Cd $(CN)_2$ | $3.84 \times 10^{-3}$ |
| 4 AgI—KI—$ZnI_2$ | $5 \times 10^{-6}$ |
| 4 AgI—KCN—$ZnI_2$ | $1 \times 10^{-5}$ |
| 4 AgI—KI—Cd $(I)_2$ | $1.67 \times 10^{-3}$ |
| 4 AgI—KCN—Cd $(I)_2$ | $3.33 \times 10^{-4}$ |
| 4 AgI—KCN—Cd $(CN)_2$ | $5.00 \times 10^{-3}$ |
| 4 AgI—KI—2Cd $(CN)_2$ | $1.43 \times 10^{-3}$ |
| 4 AgI—KCN—0.5 Cd $(CN)_2$ | $3.64 \times 10^{-2}$ |
| 3 AgI—KI—Cd $(CN)_2$ | $8.00 \times 10^{-3}$ |
| 2 AgI—KI—Cd$(CN)_2$ | $3.33 \times 10^{-4}$ |
| 4 AgI—KI—Ni $(CN)_2$ | $8.00 \times 10^{-2}$ |
| 2 AgI—KI—Ni $(CN)_2$ | $7.14 \times 10^{-2}$ |
| 4 AgI—KI—Mn $(CN)_2$ | $6.25 \times 10^{-2}$ |
| 4 AgI—KCN—Co $(CN)_2$ | $1.25 \times 10^{-2}$ |
| 4 AgI—KCN—$CoI_2$ | $1.33 \times 10^{-2}$ |
| 4 AgI—KI—$CoI_2$ | $5.0 \times 10^{-6}$ |
| 4 AgI—KI—Co$(CN)_2$ | $4.35 \times 10^{-2}$ |
| 4 AgI—KI—Sn$(CN)_2$ | $5.0 \times 10^{-2}$ |
| AgI—KCN—CuCN | $8.70 \times 10^{-4}$ |
| 4 AgI—KCN—CuCN | $1.25 \times 10^{-2}$ |
| 4 AgI—KCN—T1CN | $4.00 \times 10^{-3}$ |
| 5.28 AgI—KCN—2.64 $HgI_2$ | $3.5 \times 10^{-2}$ |
| 8 AgI—KCN—4 $HgI_2$ | $3.4 \times 10^{-2}$ |
| 5.28 AgI—KI—2.64 $HgI_2$ | $2.3 \times 10^{-2}$ |
| 8 AgI—KCN—4 $CdI_2$ | $1. \times 10^{-3}$ |

It will be seen from the above data that with few exceptions all of the compositions listed had conductivities above the desirable minimum mentioned previously and most had very good conductivity. The specific conductance of the binary material 4 AgI—KCN has been measured at 25° C. to be $1.4 \times 10^{-1}$ ohm$^{-1}$ cm.$^{-1}$. The ternary composition 4 AgI—KI—$Zn(CN)_2$ as seen in the table has the same conductivity. Accordingly, this ternary composition is perferred.

To determine the effect of molar proportions on the preferred ternary composition a number of different compositions were prepared and their specific conductance measured. The data are set forth in Table II.

TABLE II

| Mole percent AgI | Mole: AgI | Mole: KI | Mole: $Zn(CN)_2$ | Sp. conductance (ohm$^{-1}$cm.$^{-1}$, 25° C.) |
|---|---|---|---|---|
| 71.4 | 5 | 1 | 1 | $1.32 \times 10^{-1}$ |
| 66.6 | 4 | 1 | 1 | $1.40 \times 10^{-1}$ |
| 60.0 | 3 | 1 | 1 | $8.33 \times 10^{-2}$ |
| 50.0 | 2 | 1 | 1 | $3.57 \times 10^{-2}$ |
| 33.3 | 1 | 1 | 1 | $1.79 \times 10^{-2}$ |
| 20.0 | 0.5 | 1 | 1 | $2.50 \times 10^{-3}$ |
| 62.5 | 5 | 1 | 2 | $5.26 \times 10^{-2}$ |
| 57.1 | 4 | 1 | 2 | $6.25 \times 10^{-2}$ |
| 50.0 | 3 | 1 | 2 | $5.71 \times 10^{-2}$ |
| 40.0 | 2 | 1 | 2 | $2.77 \times 10^{-2}$ |
| 25.0 | 1 | 1 | 2 | $2.86 \times 10^{-3}$ |
| 14.3 | ½ | 1 | 2 | $8.33 \times 10^{-4}$ |
| 50.0 | 4 | 1 | 3 | $3.40 \times 10^{-2}$ |
| 42.9 | 3 | 1 | 3 | $3.57 \times 10^{-2}$ |
| 44.4 | 4 | 1 | 4 | $3.33 \times 10^{-2}$ |
| 50.0 | 1 | 0 | 1 | $1.25 \times 10^{-5}$ |

The data in Table II show that in the ternary system AgI—KI—$Zn(CN)_2$ good conductivity is maintained even when only 2 moles of AgI are present with 2 moles of $ZN(CN)_2$. It may also be seen that when KI is omitted entirely conductivity is very poor. Other tests, not reported in Table II, have indicated that while the pure iodide system 4AgI—KI—$ZnI_2$ and the mixed system $$4AgI—KCN—ZnI_2$$

are relatively poor in conductivity, doubling the KCN in the latter produces a good conductor 4AgI—2KCN—$ZnI_2$. The data suggest that if $ZnI_2$ is to be added to systems of AgI—KCN the ratio of CN to I should be at least one and preferably greater.

The significance of the data of Table II may be appreciated when weight percentages are taken into account. Thus in the binary composition 4AgI—KI there is 43% by weight of silver. In the ternary composition $$4AgI—KI—Zn(CN)_2$$

which has the same conductivity only 35.3% by weight of silver is present. By raising the molar proportion of additive at the expense of AgI even further weight of silver can be saved without undue loss of conductivity.

The good specific conductance of the compositions of the invention commends their use as electrolytes in solid state battery systems, suitably employing a silver anode with an appropriate cathode. They may also be used in other electrochemical devices utilizing an ionic conductor.

What is claimed is:

1. A solid ionically conducting material having a specific conductance at 25° C. of at least $5 \times 10^{-4}$ ohm$^{-1}$ cm.$^{-1}$ composed of an at least ternary composition containtaining silver iodide as one component, a compound selected from the group consisting of alkali metal iodide and alkali metal cyanide as a second component, said alkali metal being selected from the group consisting of potassium, rubidium and cesium, and as a third component at least 9 mole percent of a cyanide of a metal selected from the group consisting of manganese, iron, cobalt, nickel, copper, zinc, gallium, cadmium, indium, tin, gold, mercury and thallium.

2. A material as defined by claim 1 in which said second component is alkali metal iodide.

3. A material as defined by claim 2 in which said alkali metal iodide is potassium iodide.

4. A material as defined by claim 1 in which said second component is alkali metal cyanide.

5. A material as defined by claim 4 in which said alkali metal cyanide is KCN.

6. A material as defined by claim 1 in which said silver iodide is present in a proportion of about 4 moles and said second and third components are present in a proportion of about 1 mole each.

7. A material as defined by claim 1 composed of silver iodide, potassium iodide, and zinc cyanide.

8. A material as defined by claim 7 in which the molar proportions of the components are represented by the formula 4AgI—KI—$Zn(CN)_2$.

References Cited

UNITED STATES PATENTS

| | | | |
|---|---|---|---|
| 3,519,404 | 7/1970 | Argue et al. | 136—153 |
| 3,003,017 | 10/1961 | Weininger | 136—153 |

OTHER REFERENCES

Foley, Solid Electrolyte Galvanic Cells, Journal of the Electrochemical Society, pp. 13C–22C, January 1969.

DONALD L. WALTON, Primary Examiner

U.S. Cl. X.R.

23—367